(12) United States Patent
Patil et al.

(10) Patent No.: US 8,720,557 B2
(45) Date of Patent: May 13, 2014

(54) IN-SITU CROSSLINKING WITH ALUMINUM CARBOXYLATE FOR ACID STIMULATION OF A CARBONATE FORMATION

(75) Inventors: Prajakta R. Patil, Pune (IN); Anjali R. Sarda, Pune (IN); Shoy C. George, Thrissur (IN); Yogesh K Choudhary, Sarwar (IN); Rajendra Kaigankar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 176 days.

(21) Appl. No.: 13/349,740

(22) Filed: Jan. 13, 2012

(65) Prior Publication Data

US 2013/0180713 A1  Jul. 18, 2013

(51) Int. Cl.
| | |
|---|---|
| E21B 43/25 | (2006.01) |
| E21B 43/27 | (2006.01) |
| C09K 8/72 | (2006.01) |
| C09K 8/76 | (2006.01) |

(52) U.S. Cl.
USPC ............ 166/281; 166/300; 166/307; 507/226; 507/277; 507/903

(58) Field of Classification Search
None
See application file for complete search history.

(56) References Cited

U.S. PATENT DOCUMENTS

| | | | |
|---|---|---|---|
| 3,795,276 A | 3/1974 | Eilers et al. | |
| 3,839,255 A | 10/1974 | Podlas | |
| 4,018,286 A | 4/1977 | Gall et al. | |
| 4,486,335 A | 12/1984 | Majewicz | |
| 4,488,975 A | 12/1984 | Almond | |
| 4,696,698 A | 9/1987 | Harriett | |
| 4,948,428 A | 8/1990 | Liao | |
| 5,211,859 A | 5/1993 | Horton et al. | |
| 5,420,195 A | 5/1995 | Mayer | |
| 7,059,405 B2 | 6/2006 | Farabee | |
| 7,205,264 B2 * | 4/2007 | Boles | 507/225 |
| 7,527,102 B2 | 5/2009 | Crews | |
| 7,735,558 B2 * | 6/2010 | Welton | 166/307 |
| 2004/0059054 A1 | 3/2004 | Lopez et al. | |
| 2004/0138070 A1 | 7/2004 | Jones et al. | |
| 2004/0152602 A1 | 8/2004 | Boles | |
| 2005/0065041 A1 | 3/2005 | Hill | |
| 2005/0197257 A1 | 9/2005 | Bouwmeester | |
| 2008/0202759 A1 | 8/2008 | Welton | |
| 2009/0048126 A1 | 2/2009 | Phatak et al. | |
| 2010/0048429 A1 | 2/2010 | Dobson, Jr. et al. | |
| 2010/0314114 A1 | 12/2010 | Moradi-Araghi et al. | |
| 2011/0214868 A1 | 9/2011 | Funkhouser et al. | |

FOREIGN PATENT DOCUMENTS

GB        2443727 A       5/2008

OTHER PUBLICATIONS

PCT International Search Report, PCT/US2013/020745, Issued May 14, 2013.
PCT Search Report, Antoinette, Moris; Oct. 6, 2011.
Reaction Kinetics of the Uptake of Chromium(111) Acetate by Polyacrylamide, R. Jain, et al., Society of Professional Engineers SPE 89399, Apr. 2004.
Propagation of Regular HCl Acids in Carbonate Rocks: The Impact of an In-Situ Gelled Acid Stage; Gomaa, et al; Society of Professional Engineers, SPE 130586; Jun. 2010.
New Insights Into the Viscosity of Polymer-Based In-Situ-Gelled Acids; Gomaa, et al.; Society of Professional Engineers, Aug. 2009.

* cited by examiner

*Primary Examiner* — George Suchfield
(74) *Attorney, Agent, or Firm* — Holly Soehnge; Booth Albanesi Schroeder LLC

(57) ABSTRACT

A method of treating a zone of a subterranean carbonate formation penetrated by a wellbore is provided. The method includes the steps of: According to an embodiment, a method of treating a zone of a subterranean carbonate formation penetrated by a wellbore is provided, the method including the steps of: (a) forming a treatment fluid comprising: (i) water; (ii) a water-soluble polymer having at least one functional group that can be crosslinked with aluminum(III); and (iii) a water-soluble aluminum carboxylate; wherein the pH of the treatment fluid is less than 1; (b) introducing the treatment fluid through the wellbore into the zone; and (c) allowing time for the strong acid in the treatment fluid to spend in the formation such that the pH of the fluid increases sufficiently for the aluminum of the aluminum carboxylate to crosslink the polymer.

23 Claims, No Drawings

US 8,720,557 B2

IN-SITU CROSSLINKING WITH ALUMINUM CARBOXYLATE FOR ACID STIMULATION OF A CARBONATE FORMATION

TECHNICAL FIELD

The inventions are in the field of producing crude oil or natural gas from subterranean formations. More specifically, the inventions relate to in-situ crosslinking of a fluid for acid stimulation of a carbonate formation. Applications include acid stimulation (matrix or fracture acidizing) of carbonate formation, leak-off control in acid fracturing, and diversion in matrix acidizing.

BACKGROUND

Oil & Gas Wells

In the context of production from a well, oil and gas are understood to refer to crude oil and natural gas. Oil and gas are naturally occurring hydrocarbons in certain subterranean formations.

A subterranean formation is a body of rock that has sufficiently distinctive characteristics and is sufficiently continuous for geologists to describe, map, and name it. A subterranean formation containing oil or gas is sometimes referred to as a reservoir.

A reservoir may be located under land or under the seabed off shore. Oil and gas reservoirs are typically located in the range of a few hundred feet (shallow reservoirs) to a few tens of thousands of feet (ultra-deep reservoirs) below the surface of the land or seabed.

To produce oil or gas from a reservoir, a well is drilled into a subterranean formation, which may be the reservoir or adjacent to the reservoir. A well includes a wellhead and at least one wellbore from the wellhead penetrating the earth. Typically, a wellbore must be drilled hundreds or thousands of feet into the earth to reach a hydrocarbon-bearing formation.

The wellbore refers to the drilled hole, including any cased or uncased portions of the well. The borehole usually refers to the inside wellbore wall, that is, the rock face or wall that bounds the drilled hole. A wellbore can have portions that are vertical, horizontal, or anything in between, and it can have portions that are straight, curved, or branched. The wellhead is the surface termination of a wellbore, which surface may be on land or on a seabed. As used herein, "uphole," "downhole," and similar terms are relative to the direction of the wellhead, regardless of whether a wellbore portion is vertical or horizontal.

Broadly, a "zone" refers to an interval of subterranean rock along a wellbore that is differentiated from other zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." As used herein, a "treatment zone" refers to an interval of rock along a wellbore into which a well fluid is directed to flow from the wellbore.

Well Servicing and Well Fluids

Generally, well services include a wide variety of operations that may be performed in oil, gas, geothermal, or water wells, such as drilling, cementing, completion, and intervention. These well services are designed to facilitate or enhance the production of desirable fluids such as oil or gas from or through a subterranean formation.

A well service usually involves introducing a well fluid into a well. As used herein, a "well fluid" is a fluid used in a well service. As used herein, a "well fluid" broadly refers to any fluid adapted to be introduced into a well for any purpose. A well fluid can be, for example, a drilling fluid, a cementing composition, a treatment fluid, or a spacer fluid. If a well fluid is to be used in a relatively small volume, for example less than about 200 barrels (about 32 m$^3$), it is sometimes referred to in the art as a wash, dump, slug, or pill.

Common Well Treatments and Treatment Fluids

Well services can include various types of treatments that are commonly performed in a wellbore or subterranean formation. As used herein, the word "treatment" refers to any treatment for changing a condition of a portion of a wellbore or an adjacent subterranean formation; however, the word "treatment" does not necessarily imply any particular treatment purpose.

A treatment usually involves introducing a treatment fluid into a well. As used herein, a "treatment fluid" is a fluid used in a treatment. Unless the context otherwise requires, the word "treatment" in the term "treatment fluid" does not necessarily imply any particular treatment or action by the fluid.

For example, during completion or intervention, stimulation is a type of treatment performed to enhance or restore the productivity of oil and gas from a well. Stimulation treatments fall into two main groups: hydraulic fracturing and acidizing (fracture and matrix) treatments. Fracturing treatments are performed above the fracture pressure of the subterranean formation to create or extend a highly permeable flow path between the formation and the wellbore. Matrix treatments are performed below the fracture pressure of the formation.

Hydraulic Fracturing

Hydraulic fracturing is a common stimulation treatment. The purpose of a fracturing treatment is to provide an improved flow path for oil or gas to flow from the hydrocarbon-bearing formation to the wellbore. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Usually, but not in all applications, a proppant should not melt, dissolve, or otherwise degrade from the solid state under the downhole conditions.

Acid Stimulation of a Carbonate Formation

A widely used stimulation technique is acidizing, in which a treatment fluid including an aqueous acid solution is introduced into a subterranean formation to dissolve acid-soluble materials. In this way, hydrocarbon fluids can more easily flow from the formation into the well. In addition, an acid treatment can facilitate the flow of injected treatment fluids from the well into the formation.

Acid stimulation is commonly performed in both sandstone and carbonate formations. In acidizing a carbonate formation, calcium and magnesium carbonates can be dissolved with acid. For example, limestone is essentially calcium carbonate. Dolomite is essentially a combination of calcium carbonate and magnesium carbonate, wherein at least 50% of the cations are magnesium. As used herein, a carbonate formation is at least 50% by weight calcium carbonate, magnesium carbonate, or a combination thereof.

In carbonate formations, the goal is actually a stimulation treatment where in the acid forms highly conductive flow channels called wormholes in the formation rock. In sandstone formations, however, the acid primarily removes or dissolves acid soluble damage in the near wellbore region and is thus classically considered a damage removal technique and not a stimulation technique. To remove damage in sandstone formations requires different acid systems, such as a combination of hydrofluoric and hydrochloric acid.

Acidizing techniques for stimulation can be carried out as acid fracturing or as matrix acidizing. In acid fracturing, an acidizing fluid is pumped into a formation at a sufficient pressure to cause fracturing of the formation and creating differential (non-uniform) etching fracture conductivity. In matrix acidizing, an acidizing fluid is injected from the well into the formation at a rate and pressure below the pressure sufficient to create a fracture in the formation. Greater details, methodology, and exceptions can be found in "Production Enhancement with Acid Stimulation" $2^{nd}$ edition by Leonard Kalfayan (PennWell 2008), SPE 129329, SPE 123869, SPE 121464, SPE 121803, SPE 121008, IPTC 10693, 66564-PA, and the references contained therein.

Acid Fracturing

When the acid is injected above the fracture pressure of the formation being treated, the treatment is called acid fracturing or fracture acidizing. The object is to create a large fracture that serves as an improved flowpath through the rock formation. After such fractures are created, when pumping of the fracture fluid is stopped and the injection pressure drops, the fracture tends to close upon itself and little or no new flow path is left open after the treatment. Commonly, a proppant is added to the fracturing fluid so that, when the fracture closes, proppant remains in the fracture, holds the fracture faces apart, and leaves a flowpath conductive to fluids. Alternatively, instead of propping, if the formation rock is acid soluble, for example is a carbonate, an acid may be used as a component of the fracturing fluid. The acid differentially etches the faces of the fracture, creating or exaggerating asperities, so that, when the fracture closes, the opposing faces no longer match up. Consequently they leave an open pathway for fluid flow.

A problem with this technique is that as the acid is injected it tends to react with the most reactive rock and/or the rock with which it first comes into contact. Thus, much of the acid is used up near the wellbore and is not available for etching of the fracture faces farther from the wellbore. Furthermore, the acidic fluid follows the paths of least resistance, which are for example either natural fractures in the rock or areas of more permeable or more acid-soluble rock. This process creates typically long branched passageways in the fracture faces leading away from the fracture, usually near the wellbore. These highly conductive micro-channels are called "wormholes" and are very deleterious because subsequently-injected fracturing fluid tends to leak off into the wormholes rather than lengthening the desired fracture. To block the wormholes, techniques called "leak-off control" techniques have been developed. This blockage should be temporary, because the wormholes are preferably open to flow after the fracturing treatment; fluid production through the wormholes adds to total production.

Matrix Acid Stimulation

When an acidic fluid is used to stimulate a substantially acid-soluble producing, or potentially-producing, formation below the fracturing pressure, the treatment is called matrix stimulation or matrix acidizing. Numerous studies have shown that the dissolution pattern created by the flowing acid occurs by one of three mechanisms (a) compact dissolution, in which most of the acid is spent near the wellbore rock face; (b) wormholing, in which the dissolution advances more rapidly at the tips of a small number of wormholes than at the wellbore walls; and (c) uniform dissolution, in which many pores are enlarged. Compact dissolution occurs when acid spends on the face of the formation. In this case, the live acid penetration is commonly limited to within a few centimeters of the wellbore. Uniform dissolution occurs when the acid reacts under the laws of fluid flow through porous media. In this case, the live acid penetration will be, at most, equal to the volumetric penetration of the injected acid. (Uniform dissolution is also the preferred primary mechanism of conductive channel etching of the fracture faces in acid fracturing, as discussed above.) The objectives of the acidizing process are met most efficiently when near wellbore permeability is enhanced to the greatest depth with the smallest volume of acid. This occurs in regime (b) above, when a wormholing pattern develops.

However, just as wormholing prevents the growth of large fractures, wormholing prevents the uniform treatment of long horizontal or vertical regions of a formation. Once wormholes have formed, at or near a point in the soluble formation where the acid first contacts the formation, subsequently-injected acid will tend to extend the existing wormholes rather than create new wormholes further along the formation. Temporary blockage of the first wormholes is needed so that new wormholes can be formed and the entire section of the formation treated. This is called "diversion," as the treatment diverts later-injected acid away from the pathway followed by earlier-injected acid. In this case, the blockage must be temporary because all the wormholes are needed to serve as the primary production pathway.

Leak-off Control or Matrix Diversion

In subterranean treatments in conventional reservoirs, it is often desired to treat a zone of a subterranean formation having sections of varying permeability, varying reservoir pressures, or varying degrees of formation damage, and thus may accept varying amounts of certain treatment fluids. Low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire zone. For instance, the treatment fluid may preferentially enter portions of the zone with low fluid flow resistance at the expense of portions of the zone with higher fluid flow resistance. Matrix diversion is different from zonal diversion between different zones. See U.S. Patent Publication No. 2011/0028358 published Feb. 3, 2011 having for named inventors Thomas D. Welton and Bradley L. Todd entitled "Methods of Fluid Loss Control and Fluid Diversion in Subterranean Formations," which is incorporated by reference in the entirety.

Commonly, similar methods and fluids may be used for "leak-off control" in acid fracturing and for "diversion" in matrix acidizing. Such a method or acidic fluid may be termed a "leak-off control acid system" or "LCA system" or a "self-diverting acid system" or "SDA system" depending upon its use and purpose.

Increasing Viscosity of Fluid for Leak-off Control or Matrix Diversion

Increasing the viscosity or gelling of a fluid can help divert subsequently introduced fluid from higher permeability to lower permeability portions of a zone. This can be useful for leak-off control in acid fracturing or matrix diversion in matrix acidizing.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the continuous phase of a fluid. Polymers for increasing the viscosity of a fluid can be naturally occurring polymers such as polysaccharides, derivatives of naturally occurring polymers, or synthetic polymers.

Treatment fluids used in high volumes are usually water-based. Efficient and inexpensive viscosity-increasing agents for water include certain classes of water-soluble polymers.

As will be appreciated by a person of skill in the art, the dispersability or solubility in water of a certain kind of polymeric material may be dependent on the salinity or pH of the water. Accordingly, the salinity or pH of the water can be modified to facilitate the dispersability or solubility of the water-soluble polymer. In some cases, the water-soluble polymer can be mixed with a surfactant to facilitate its dispersability or solubility in the water or salt solution utilized.

The water-soluble polymer can have an average molecular weight in the range of from about 50,000 to 20,000,000, most preferably from about 100,000 to about 4,000,000.

The viscosity-increasing agent may be provided in any form that is suitable for the particular treatment fluid or application of the present invention. In certain embodiments, the viscosity-increasing agent may be provided in the form of a liquid, gel, suspension, or solid that is mixed or incorporated into a treatment fluid used in conjunction with the present invention.

Crosslinking of Polymer to Further Increase Viscosity of a Fluid or Form a Gel

The viscosity of a fluid with a polymeric viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

The degree of crosslinking depends on the type of viscosity-increasing polymer used, the type of crosslinker, concentrations, temperature of the fluid, etc. Shear is usually required to mix a base gel and the crosslinking agent. Thus, the actual number of crosslinks that are possible and that actually form also depends on the shear level of the system.

If the polymeric viscosity-increasing agent is in a sufficient concentration and crosslinked to a sufficient extent, the polymer may form a gel with water. Gel formation is based on a number of factors including the particular polymer and concentration thereof, the particular crosslinker and concentration thereof, the degree of crosslinking, temperature, and a variety of other factors known to those of ordinary skill in the art.

Breaking Fluid Viscosity

After a treatment fluid is placed where desired in the well and for the desired time, the viscous fluid or gel usually must be removed from the wellbore or the formation to allow for the production of oil or gas. To accomplish this removal, the viscosity of the treatment fluid must be reduced to a very low viscosity, preferably near the viscosity of water, for optimal removal from the zone of the subterranean formation.

Reducing the viscosity of a viscosified fluid is referred to as "breaking" the fluid. Chemicals used to reduce the viscosity of fracturing fluids are called "breakers."

No particular mechanism is necessarily implied by the term. A breaker or breaking mechanism should be selected based on its performance in the temperature, pH, time, and desired viscosity profile for each specific treatment.

Iron-Based Crosslinking Systems

An example of such a leak-off control acid system or self-diverting acid system is described in European Patent Application Publication No. 0278540 B1, assigned to Schlumberger Technology. The strongly acidic system initially has low viscosity but includes a soluble ferric ion source and a polymeric gelling agent that is crosslinked by ferric ions at a pH of about 2 or greater but not at a lower pH. However, the polymer is not crosslinked by ferrous ions. Therefore, the system includes a reducing agent that reduces ferric ions to ferrous ions, but only at a pH above about 3 to 3.5. Consequently, as the acid spends, for example in a wormhole, and the pH increases to about 2 or greater, the polymer crosslinks, and a very viscous gel forms that inhibits further flow of fresh acid into the wormhole. As the acid spends further and the pH continues to rise, the reducing agent converts the ferric ions to ferrous ions and the gel reverts to a more fluid water-like state. Hydrazine salts and hydroxylamine salts are specified as the reducing agents.

Another example is described in U.S. Patent Publication No. US 2005/0065041 A1, assigned to Schlumberger Technology. Reducing agents or reducing agent precursors are provided for breaking ferric ion crosslinks in polymers in gelled acids used for diversion in matrix acidizing and used for leak-off control in acid fracturing. Previous reducing agents were very toxic to aquatic species or so active that they could be used only at low temperatures. The described reducing agents and reducing agent precursors for iron are less reactive, less toxic, and leave less residue behind to impede fluid flow after the gel is broken after the treatment. Suitable compounds are disclosed as being sources of one or two hydrazines or sources of hydroxylamine. Such compounds are carbohydrazides, semicarbohydrazides, ketoximes, and aldoximes.

Problems with Iron-Based Crosslinking Systems

Iron-based crosslinkers such as ferric chloride for in-situ crosslinking in acidizing systems have a tendency to form iron depositions, precipitation, sludge, and scale formation during the acidizing treatment when the acid is spent, which damages the subterranean formation. There is a continuing need for an alternative to iron-based crosslinking systems for acid stimulation using fluids that become highly viscous or gelled in a desirable pH range and then breaking for flow back from the subterranean formation. Therefore, an objective of this project was to develop an alternative crosslinker for the ferric chloride, while maintaining overall treatment performance of the in-situ crosslinking for an acidizing system.

SUMMARY OF INVENTION

According to an embodiment, a method of treating a zone of a subterranean carbonate formation penetrated by a wellbore is provided, the method including the steps of:
(a) forming a treatment fluid comprising:
   (i) water;
   (ii) a water-soluble polymer having at least one functional group that can be crosslinked with aluminum (III); and
   (iii) a water-soluble aluminum carboxylate;
   wherein the pH of the treatment fluid is less than 1;
(b) introducing the treatment fluid through the wellbore into the zone; and
(c) allowing time for the strong acid in the treatment fluid to spend in the formation such that the pH of the fluid increases sufficiently for the aluminum to crosslink the polymer.

According to another embodiment of the invention, a method of treating a zone of a subterranean carbonate formation penetrated by a wellbore is provided, the method including the steps of:
(a) forming a treatment fluid comprising:
   (i) water;
   (ii) a strong acid;
   (iii) a water-soluble polymer having at least one functional group that can be crosslinked with aluminum (III); and
   (iv) a water-soluble aluminum carboxylate;
   wherein the pH of the treatment fluid is less than the pH required for the aluminum to crosslink the polymer to form a crosslinked gel;
(b) introducing the treatment fluid through the wellbore into the zone; and
(c) allowing time for the strong acid in the treatment fluid to spend in the formation such that the pH of the fluid increases sufficiently for the aluminum to crosslink the polymer, thereby forming a crosslinked gel in the zone.

The method can be used in acid stimulation treatments, including, for example, in acid fracturing or matrix acidizing.

Preferably, the method includes the step of allowing time for the strong acid and any other acids in the previously-introduced treatment fluid to spend against the formation such that the pH increases sufficiently to break the crosslinked gel.

Although the methods have been described here for, and are most typically used for, hydrocarbon production, they may also be used in storage wells and injection wells, and for production of other fluids, such as water or brine.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF PRESENTLY PREFERRED EMBODIMENTS

Definitions and Usages

Interpretation

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

General Terms

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. are assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there by any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Physical and Chemical Terms

The physical state or phase of a substance (or mixture of substances) and other physical properties are determined at a temperature of 77° F. (25° C.) and a pressure of 1 atmosphere (Standard Laboratory Conditions) under no shear.

A fluid is a substance that behaves as a fluid under standard laboratory conditions, that is, at 77° F. (25° C.) temperature and 1 atmosphere pressure, and at the higher temperatures and pressures occurring in subterranean formations.

A fluid inherently has at least a continuous phase. A fluid can have more than one phase. The continuous phase of a well fluid is a liquid under standard laboratory conditions. For example, a well fluid can in the form of be a suspension (solid particles dispersed in a liquid phase), an emulsion (liquid particles dispersed in another liquid phase), or a foam (a gas phase dispersed in liquid phase).

As used herein, a water-based fluid means that water or an aqueous solution is the dominant material, that is, greater than 50% by weight, of the continuous phase of the substance.

A substance is considered to be "soluble" in a liquid if at least grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersability, or solubility of a substance in water can be dependent on the salinity, pH, or other substances in the water. Accordingly, the salinity, pH, and additive selection of the water can be modified to facilitate the hydratability, dispersability, or solubility of a substance in aqueous solution. To the extent not specified, the hydratability, dispersability, or solubility of a substance in water is determined in deionized water, at neutral pH, and without any other additives.

Viscosity and Gel Terms

The apparent viscosity of a fluid (excluding any suspended solid particulate larger than silt) is measured with a Fann Model 35 type viscometer using an R1 rotor, B1 bob, and F1 torsion spring at a shear rate of 511 1/s, and at a temperature of 77° F. (25° C.) and a pressure of 1 atmosphere. For reference, the viscosity of pure water is about 1 cP.

A substance is considered to be a fluid if it has an apparent viscosity less than 5,000 cP (independent of any gel characteristic).

A fluid is considered to be "viscous" if it has an apparent viscosity of 15 cP or higher. The viscosity of a viscous fluid is considered to break or be broken if the viscosity is reduced to 3 cP or lower.

The physical state of a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel phase is sometimes considered as a single physical state or phase.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, but that excludes any crosslinking agents. Similarly, a "crosslinked gel" may refer to a substance having a viscosity-increasing agent that is crosslinked, regardless of whether it is a viscous fluid or meets the technical definition for the physical state of a gel. Typically, a base gel is mixed with another fluid containing a crosslinker, wherein the mixed fluid is adapted to form a crosslinked gel.

To be considered to be suitable for use in matrix diversion, it is believed that a crosslinked gel needs to exhibit a sufficiently high viscosity, that is, at least about 300 cP at a shear rate of 100 sec$^{-1}$. Preferably, the crosslinked gel exhibits "lipping," which is distinguishable from freely pouring, when poured out of a container. A lipping gel has a much lower tendency to disperse than a liquid such as water.

Well Terms

The term "design temperature" refers to an estimate or measurement of the actual temperature at the down hole environment at the time of the treatment. That is, design temperature takes into account not only the bottom hole static temperature ("BHST"), but also the effect of the temperature of the treatment fluid on the BHST during treatment. Because treatment fluids may be considerably cooler than BHST, the difference between the two temperatures can be quite large. Ultimately, if left undisturbed, a subterranean formation will return to the BHST.

Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of the continuous phase of the fluid without the weight of any viscosity-increasing agent, dissolved salt, suspended particulate, or other materials or additives that may be present in the water.

Any doubt regarding whether units are in U.S. or Imperial units, where there is any difference, U.S. units are intended. For example, "gal/Mgal" means U.S. gallons per thousand U.S. gallons.

Acid Stimulation with Leak-Off Control or Diversion

The treatment fluids for use according to the invention have desired rheological properties without the need to use an iron-based crosslinker.

For the purposes of acidizing stimulation according to the invention, crosslinking should not occur in "live" acid, that is, in an aqueous fluid having a pH less than 1. Initial spending of the live acid during leak-off and wormholing produces a rise in pH to a value of above 1, which initiates crosslinking of the polymer (resulting in and evidenced by a rapid increase in viscosity.) Preferably, the fully crosslinked gel has a maximum viscosity greater than 300 cP at a shear rate of 100 sec$^{-1}$, and more preferably greater than 1,000 cP at a shear rate of 100 sec$^{-1}$, and most preferably is a lipping gel. A lipping gel is obviously a crosslinked gel.

This increase in viscosity or the formation of a gel creates the diversion from wormholes, from fissures, and within the matrix of the subterranean formation. The highly viscous or gelled acid will plug off any thief zone, forcing the following stage or stages of fresh live acid to be diverted. The lower viscosity fresh live acid allows penetration into other wormholes and fractures, until the reaction of the fresh live acid increases the pH value and causes crosslinking, thereby diverting the following acid stages to other portions of the reservoir. Acid in the wellbore and from subsequent treatment stages can help keep the pH sufficiently low so that the high viscosity or lipping gel will be maintained until the end of the job, at which time the acid is allowed to spend completely.

As the viscous or gelled acid spends further, the pH continues to increase. The crosslinked gel begins to break at a pH above about 3. As the crosslinked gel structure collapses, it becomes a fluid having a much lower viscosity. Further pH increases to values above about 3.5 will further reduce the viscosity, preferably at least down to that of an uncrosslinked polymer-thickened fluid (that is, a base gel of the polymer) at the design temperature.

Although not highly viscous (having a viscosity greater than 300 cP at a shear of 100 sec$^{-1}$), being a viscous fluid (having a viscosity greater than 10 cP) after spending of the acid assists in maintaining the formation fines in suspension and facilitates an improved cleanup (if the reservoir is not too depleted). Since the crosslinked gel begins to break at a pH above about 3 to 3.5, flowback represents no difficulty once fresh acid injection is stopped and the acid is allowed to spend completely against the formation.

Aluminum Carboxylate Crosslinking and Theory

The purpose of this project was to develop a non-iron based crosslinker for an in-situ crosslinking for an acidizing system. As part of this project, it was desired to develop a suitable non-iron based crosslinker and relevant laboratory performance testing in at least 20% hydrochloric acid for temperatures up to at least 275° F.

It was discovered that an aluminum(III) carboxylate can be used a replacement of ferric chloride for in-situ crosslinking in an acidizing treatment fluid.

Without being limited by any theory, according to the invention the crosslinking is believed to be formed by reaction between an aqueous solution of a polymer having at least one functional group that can be crosslinked with aluminum (III) by an Al(III)-carboxylate ligand salt such as Al-acetate. Aluminum(III) can form a complex ion in solution that can react by ligand-exchange reaction with carboxylate or hydrolyzed groups on the polymer molecules to form crosslinks resulting in a network or gel. It is believed this crosslinking is very sensitive to pH and occurs only within a narrow pH range between 1 and 3.

Moreover, an aluminum carboxylate crosslinker should not have any precipitation or sludging problems.

Treatment Fluid

According to an embodiment of the invention, the method includes forming a treatment fluid includes:
  (i) water;
  (ii) a water-soluble polymer having at least one functional group that can be crosslinked with aluminum(III); and
  (iii) a water-soluble aluminum carboxylate;
  wherein the pH of the treatment fluid is less than 1.

According to another embodiment, a treatment fluid for use according to the invention includes:
  (i) water;
  (ii) a strong acid;
  (iii) a water-soluble polymer having at least one functional group that can be crosslinked with aluminum(III); and
  (iv) a water-soluble aluminum carboxylate;
  wherein the pH of the treatment fluid is less than the pH required for the aluminum to crosslink the polymer.

Water in Continuous Aqueous Phase

The continuous aqueous phase of the treatment fluid is a liquid. According to the invention, the treatment fluid is preferably a water-based fluid.

Preferably, the water for use in the treatment fluid does not contain anything that would adversely interact with the other components used in accordance with this invention or with the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water.

In some embodiments, the aqueous phase of the treatment fluid may comprise a brine. The brine chosen should be compatible with the formation and should have a sufficient density to provide the appropriate degree of well control.

Salts may optionally be included in the treatment fluids of the present invention for many purposes. For example, salts may be added to a water source, for example, to provide a brine, and a resulting treatment fluid, having a desired density. Salts may optionally be included for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid suitable for use in the present invention.

Suitable salts can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Strong Acid

The strong acid is an Arrhenius acid having a pKa(1) in water of less than −1.74. In embodiments of the present invention, suitable strong acids can be any acid generally used in fracture acidizing or matrix acidizing, including by way of example, but again not limited thereto, HCl, HBr, and mixtures thereof. Hydrochloric acid is the presently most preferred embodiment, as it is the most widely used strong acid for acid stimulation of carbonate formations.

Preferably, the concentration of the strong acid is sufficient such that the pH of the continuous aqueous phase of the treatment fluid is in less than 2. More preferably, the pH is less than 1.5. Most preferably, the pH is less than 1.0.

For leak-off control purposes, preferably, an HCl solution of from about 10% to about 20% can be employed. For self-diverting purposes, the embodiments often contain less acid. If the fluid is to be used as a diverter only, and crosslinking is desired to occur as close to the wellbore as possible, then the preferred acid concentration is from about 3% to about 15%, and the preferred acid is HCl.

Preferably, Fluid Additionally Contains Weak Acid or Buffer as pH Adjuster

Other weak acids can be included in the treatment fluid. For example, other weak mineral acids, or weak organic acids such as acetic acid and formic acid can be included, and mixtures thereof. Preferably, the one or more water-soluble weak acids include a carboxylic acid. Preferably, the aluminum mono-carboxylates, aluminum di-carboxylates, and aluminum tri-carboxylates of the weak carboxylic acid are water soluble at a pH in the range of 6-7. It is believed this will help protect against any aluminum precipitation.

The weak acid as a pH-adjuster is preferably present in the treatment fluids suitable for use in the present invention in an amount sufficient to help keep the pH of the fluid below 4. In some embodiments, the pH-adjuster may be present in an amount sufficient to maintain or adjust the pH of the fluid below a pH in the range of from about 1 to about 4. In other embodiments, the pH-adjuster may be present in an amount sufficient to help maintain or adjust the pH of the fluid to a pH in the range of from about 1 to about 4, and preferably in the range of from about 2 to about 3. Preferably, the weak acid has a pKa(1) sufficiently low and is in a sufficient concentration in the water such that the water would have a pH less than 3 without the presence of any strong acid.

A pH-adjuster may be included in the treatment fluid for, among other things, adjust the pH of the treatment fluid to, or help maintain the pH of the treatment fluid near, a pH that balances the duration of certain properties of the treatment fluid (e.g. the ability to suspend particulate) with the ability of the breaker to reduce the viscosity of the treatment fluid or a pH that will result in a decrease in the viscosity of the treatment fluid such that it does not hinder production of hydrocarbons from the formation.

In certain embodiments, the pH-adjuster comprises a salt of an organic acid such as sodium or potassium formate, sodium or potassium acetate, sodium or potassium citrate, sodium or potassium glycolate, sodium or potassium maleate, sodium or potassium phosphate, potassium dihydrogen phosphate, cesium formate, and any combinations thereof. In other embodiments, the pH-adjuster may be any other substance known in the art capable of maintaining the pH of the breaker above or below a desired limited range. One of ordinary skill in the art, with the benefit of this disclosure, will recognize the appropriate pH-adjuster and amount thereof to use for a chosen application.

Water-Soluble Polymer

A water-soluble polymer is used that has at least one functional group that can be crosslinked with aluminum(III).

Suitable polymers can be any polymer that is stable in an aqueous acid environment and that can be crosslinked in the presence of aluminum(III) ions at a pH in the range of about 1 to 3. Typically, crosslinking begins at a pH of about 1 but becomes stronger or more complete at a pH of about 2 or greater. The crosslinking is considered to be at the lowest pH for which it appears to be substantially complete and does not appear to increase beyond that highest degree of crosslinking.

The water-soluble polymer can be anionic or cationic. If anionic, the water-soluble polymer preferably has one or more functional groups selected from the group consisting of: a carboxylic acid group, a carboxylate, and a carboxylate ester. The carboxylate group, if present, is preferably selected from the group consisting of a sodium carboxylate and a potassium carboxylate. A presently most preferred example of an anionic polymer is a terpolymer of 2-acrylamido-2-methylpropane sulfonic acid ("AMPS"), acrylamide, and acrylic acid.

Suitable polymers include any carboxyl-containing polymer, as generally known in the art. Preferably, and by way of example, but not limited thereto, such polymers include acrylamide and acrylamide copolymers (particularly partially hydrolyzed acrylamide polymers and copolymers).

If cationic, the water-soluble polymer preferably has functional groups selected from carboxylate quaternary ammonium salts. A presently most preferred example of a cationic polymer is a polymer of acrylamide with a quarternary ammonium salt.

According to an embodiment, the use of viscoelastic surfactant is not required. As used herein, the term "viscoelastic surfactant" refers to a surfactant that imparts or is capable of imparting viscoelastic behavior to a fluid due, at least in part, to the association of surfactant molecules to form viscosifying micelles. Preferably, the treatment fluid does not include a sufficient concentration of any viscoelastic surfactant to impart more than 10 cP of additional viscosity to the treatment fluid. More preferably, the treatment fluid does not include any viscoelastic surfactant.

Aluminum Crosslinker

The treatment fluid includes a water-soluble aluminum carboxylate, which is believed to act as a crosslinker. The water-soluble aluminum carboxylate is preferably selected from the group consisting of: aluminum mono-acetate, aluminum di-acetate, aluminum tri-acetate and any combination thereof. According to a presently preferred embodiment, the aluminum carboxylate comprises aluminum(III) mono-acetate. Other examples include aluminum oxylate and citrate.

Preferably, the concentrations of the water-soluble polymer and the water-soluble aluminum carboxylate in the water are sufficient to form a lipping gel at a pH in the range of 1 to 3. It is not necessary for the crosslinking to occur over the entire pH range.

Compatible Additives

In embodiments of the present invention, other components or additives can be included in the treatment fluid provided that they are compatible with all required components and functions of the treatment fluid and do not unduly interfere with its performance. Typical additives that may be included are pH control additives, corrosion inhibitors, surfactants, silicate control additives, emulsion and sludge preventers, and non-emulsifying agents known to those in the field.

Any additives should be tested for compatibility with the treatment fluid being used.

For example, corrosion inhibitors are preferably included in acidizing fluids to protect oilfield equipment and tubulars, but not all corrosion inhibitors are compatible with the treatment fluid and methods according to the invention. Commercially-available corrosion inhibitors are typically mixtures of many chemical compounds, some of which may irreversibly crosslink the polymer or may be strong reducing or oxidizing agents. Commercial corrosion inhibitor packages should therefore always be tested before use for compatibility with the treatment fluid being used.

It should be understood, however, that in an embodiment the treatment fluid need not and does not include hydrofluoric acid, which is not normally required for acid stimulation of carbonate formations. Preferably, the treatment fluid contains less than 5% by weight HF. More preferably, it does not contain any HF.

Forming the Treatment Fluid

The treatment fluid may be prepared at the job site, prepared at a plant or facility prior to use, or certain components of the treatment fluid may be pre-mixed prior to use and then transported to the job site. Certain components of the treatment fluid may be provided as a "dry mix" to be combined with the base fluid or other components prior to or during introducing the treatment fluid into the subterranean formation. The treatment fluid can be batch-mixed or continuous-mixed.

Introducing a Well Fluid or Treatment Fluid into a Well

As used herein, introducing "into a well" means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Often the step of delivering a well fluid into a well is within a relatively short period after forming the well fluid, e.g., less within 30 minutes to one hour. More preferably, the step of delivering the well fluid is immediately after the step of forming the well fluid, which can be "on the fly." It should be understood that the step of delivering the treatment fluid into the wellbore can advantageously include the use of one or more fluid pumps.

The treatment fluid may be introduced into the subterranean formation in certain embodiments of the present invention by any means known in the art. In certain embodiments, the treatment fluid may be introduced into the subterranean formation by pumping the treatment fluid into a well bore that penetrates a zone of the subterranean formation.

In an embodiment, the step of introducing comprises introducing under conditions for fracturing a treatment zone. The fluid is introduced into the treatment zone at a rate and pressure that are at least sufficient to fracture the zone. When used as an LCA system, treatment fluid embodiments of the invention can be used, among options, alone in a treatment (for example, as a fracturing fluid) or can be used with a nonreactive pad.

In an embodiment, the step of introducing is at a rate and pressure below the fracture pressure of the treatment zone.

A method according to the inventions can include, for example, after the step of allowing time to form a crosslinked gel in the zone, the step of introducing a second treatment fluid into the zone, wherein the second treatment fluid is diverted in the zone by the gel previously formed in the zone. The second treatment fluid preferably includes: (i) water; and (ii) an acid. Preferably, the pH of the second treatment fluid is less than the pH required to break the aluminum crosslinks of the polymer in the zone. The second treatment fluid can be the same or different than the previously-introduced treatment fluid. Preferably, the second treatment fluid is different than the previously-introduced treatment fluid.

When used as an SDA system, fluid embodiments according to the invention are most preferably pumped in several stages alternately with different acid fluid stages, such as stages that do not crosslink. Treatments are staged by pumping "slugs" of the treatment fluid. Treatments can be bullheaded, but the best results are obtained from using the treatment fluid and method down coiled tubing. When used with coiled tubing for placement, the treatment fluids according to the invention provide an optimum technique for matrix diverting in carbonate reservoirs.

Preferably, the treatment fluids used in SDA applications or systems contain no solids or particulates, especially of particles larger than silt. This can be particularly important when using coiled tubing, as larger particulates could bridge when pumping through the coiled tubing.

Preferably, there are no damaging solid particles in the treatment fluids used in the methods, so the reduced-viscosity of the spent fluid is readily flowed back from the well along with the remains of the spent acid from the treatment.

The treatment fluids and methods according to the invention can be used in either cased or openhole completions, because the fluids can self-divert in the formation (in situ diversion).

The treatment fluids and methods of diversion have potential in horizontal wells, and in treating zones with widely varying permeability streaks.

Flow Back Conditions

The method preferably further includes the step of: allowing time for the strong acid and any other acids in the previously-introduced treatment fluid to spend against the formation such that the pH of crosslinked gel increases sufficiently to break the crosslinked gel, thereby reducing the viscosity of the fluid in the zone. The method preferably further includes the step of: flowing back the liquid from the zone.

Most preferably, the treatment fluid is allowed to spend to a pH greater than 3.5. Preferably to acid spends so that the pH is in the range of 4-6. After allowing time to reach the desired pH, the method preferably includes the step of flowing back from the treated zone.

In an embodiment, the step of flowing back is within 24 hours of the step of introducing.

After Well Treatment, Producing Hydrocarbon from Subterranean Formation

Preferably, after any such well treatment, a step of producing hydrocarbon from the zone of the subterranean formation is desirable.

Experiments and Examples

A goal was to identify a suitable non-iron based crosslinker for a water-soluble polymer that can work in up to at least 20% hydrochloric acid, and particularly at temperatures up to about 300° F. with a corrosion inhibitor. Laboratory tests were carried out for screening the non-iron based crosslinker and to evaluate the performance. Laboratory performance tests on gel stability at crosslinked pH and corrosion testing were conducted.

A good crosslinked gel stability was observed using Al-acetate for in-situ crosslinking in an acidizing blend with a surfactant and corrosion inhibitor. A weak acid was also included to help maintain the pH in a range for the crosslinking, which is believed to increase the time the crosslinked gel will remain crosslinked before breaking with increasing rise in pH.

In addition, the fluids with Al-acetate crosslinker successfully passed corrosion tests at 200° F. and 225° F.

Preliminary Screening for Non-Iron Based Crosslinkers

Initially following non-iron based crosslinkers were identified as potential candidates for replacement of ferric chloride in in-situ gelling acidizing system:
  (a) Aluminum-based crosslinkers;
  (b) Chromium-based crosslinkers;
  (c) Zirconium-based crosslinkers;
  (d) Titanium-based crosslinkers; and
  (e) Cobaltous-based crosslinkers.

Chromium-based crosslinkers were promptly excluded because certain chromium species can be toxic in nature. Aluminum, titanium, cobalt, and zirconium-based crosslinkers have no health, safety, or environmental concerns and are very safe to handle. Hence the initial screening tests were carried out with above mentioned crosslinkers for in-situ gelling acidizing except for any chromium-based crosslinker.

Laboratory Chemicals

The materials used in the testing included:
  (a) a representative strong acid, specifically concentrated hydrochloric acid (HCl) in water;
  (b) a representative viscosity-increasing agent, specifically either:
    (i) a cationic polymer tested at a concentration of 15 gpt in a test fluid, more specifically a terpolymer of 2-acrylamido-2-methylpropane sulfonic acid, acrylamide, and acrylic acid; or
    (ii) an anionic polymer tested at a concentration of 20 gpt in a test fluid, more specifically an acrylamide quaternary ammonium salt of dimethyl ammonium chloride;
  (c) a representative water-soluble weak acid, specifically glycolic acid 70% in water at a concentration of 2 gpt in the test fluids;
  (d) a representative corrosion inhibitor, specifically either:
    (i) a fluid including chloromethylnaphthalene quinoline quaternary amine, isopropanol, and aldehyde at a concentration of 10 gpt in the test fluids; or
    (ii) a fluid of propargyl alcohol and methanol at a concentration of 10 gpt in the test fluids;
  (e) a representative surfactant, specifically a fluid mixture of heavy aromatic petroleum naphtha and isopropanol at a concentration of 1 gpt in the test fluids;
  (f) tested crosslinkers that are known to have no health, safety, or environmental concerns and are safe to handle, specifically:
    (i) a conventional iron-based crosslinker, specifically ferric chloride ($FeCl_3$);
    (ii) three different zirconium-based crosslinkers, specifically "CL-23", "CL-29", and "CL-37", which are commercially available from Halliburton Energy Services, Inc. in Duncan, Okla.;
(iii) two different titanium based crosslinkers, specifically "CL-18" and "CL-11", which are commercially available from Halliburton Energy Services, Inc. in Duncan, Okla.;
(iv) a cobalt-based crosslinker, specifically "CAT-OS-1", which is commercially available from Halliburton Energy Services, Inc. in Duncan, Okla.; and
(v) aluminum-based crosslinkers, specifically either aluminum chloride or an aluminum(III)-carboxylate crosslinker, more specifically Al-monoacetate, which is also identified as basic aluminum monoacetate or $Al(C_2H_3O_2)(OH)_2$; and
(g) a representative carbonate for neutralizing the various test fluids, specifically calcium carbonate ($CaCO_3$).

The aluminum acetate exists as a solid powder form. In order to make it more convenient during field operation, an 80% w/v aqueous solution was prepared and used in concentration of 4.5 gpt for all the performance tests (gel stability and corrosion tests). This 80% w/v aqueous solution also gave similar performance as that of powder form. Moreover, the solution's performance was found unaltered after 2 months of preparation.

Screening Procedure

Laboratory tests were carried out for screening of non-iron based crosslinkers and to evaluate their performance.

For preparing a 100 ml test fluid, the desired amount of water and acid was added to have the desired HCl concentration in a warring blender. The additives such as the polymer, the surfactant, the corrosion inhibitor, the weak acid, and a crosslinker were added while continuously stirring the test fluid.

The test fluids with the cationic polymer were then hydrated with high-speed stirring for 3 hrs. The test fluids with the anionic polymer were then hydrated with high speed stirring for 10 minutes.

After hydration of the polymer, the test fluid was neutralized at 200° F. using calcium carbonate. The pH of each test system was monitored continuously using pH meter during neutralization process.

Preliminary Screening Results in 28% HCl

In the beginning the tests were carried out with 28% HCl and cationic polymer (15 gpt) as gelling agent at 200° F. using an existing ferric chloride solution in a concentration of 4.5 gpt as crosslinker. The blend was prepared as per the procedure described above. Also under similar test conditions, the test was also carried out with aluminum acetate in a concentration of 38.3 ppt.

As a preliminary matter, it was determined that the use of 28% HCl in water for in-situ crosslinking for an acidizing blend with existing ferric chloride was not feasible. While neutralizing this test fluid with calcium carbonate, it was observed that there is no increase in viscosity as acid spends, even if pH is increased beyond 2.

Similar to ferric chloride, this acid blend also could not build up the viscosity with acid spend.

Current in-situ crosslinking for acid stimulation systems using ferric chloride crosslinker is designed mainly for 5 to 15% HCl concentrations. It was believed that up to 28% HCl could be used, but based on this laboratory testing no crosslinking was observed with acid spend, either in ferric chloride or with any other non-iron based crosslinker in 28% HCl. This is mainly because of the high concentration of calcium chloride generated during neutralization, which reduces the viscosity of an in-situ crosslinked gel. As the calcium ion concentration while neutralization is extremely high, no viscosity rise could be seen in 28% HCl.

Fluids were tested lowering the acid concentration to 24%, 22%, and further to 20% HCl so as to optimize the acid percentage and conduct further testing. But 24% HCl with ferric chloride and Al-acetate acid blend also could not build up the viscosity with acid spend and hence these concentrations were also not suitable for further testing. Finally 20% HCl with ferric chloride acid blend could deliver the expected in-situ crosslinking at around pH 2.2 with acid spend. With carbonate neutralization of 20% HCl, a solid goo ball like in-situ crosslinking was observed that was eventually broken with further increase in pH. A non-iron based crosslinker like aluminum acetate also showed similar kind of performance in 20% HCl.

A concentration of 20% HCl is acceptable in in-situ crosslinking for acid stimulation of a carbonate formation. Therefore, 20% HCl was used for the rest of the laboratory testing.

Screening of Non-Iron Based Crosslinkers in 20% HCl

In addition to the aluminum chloride and the aluminum acetate, tests were carried out in 20% HCl with the other non-iron based crosslinkers listed above, but none of them provided desired performance. The aluminum chloride ($AlCl_3$) did not work. Only the aluminum carboxylate passed the screening test.

Observations for Aluminum Acetate Crosslinker in 20% HCl

Following observations were made for the tests with the aluminum crosslinker during initial screening of non-iron based crosslinkers:
(a) As acid spends with addition of 3.0 to 4.0 g of $CaCO_3$, a slight increase in the viscosity was observed around pH 1 which on further neutralization becomes a lipping gel (almost a solid goo ball);
(b) The lipping gel was stable in the pH range about 1 to about 3 at 200° F.;
(c) Further addition of calcium carbonate leads to increase in pH;
(d) Above pH 3, the lipping gel starts losing its viscosity and with increasing pH the crosslinked gel breaks completely; and
(e) No precipitation or sludge was observed during neutralization.

Therefore, preliminary screening results concluded that the aluminum carboxylate performs well in 20% HCl. Hence, gel stability and corrosion tests were evaluated using this newly identified non-iron based crosslinker and the results are discussed below.

Stability Testing Procedure at 250° F. and 275° F.

A stability test was performed only for the aluminum based crosslinker that had successfully passed the initial screening tests. The crosslinked gels that showed good lipping at pH about 1.5 (after following the laboratory procedure described above) were transferred to high-pressure, high-temperature ("HPHT") aging cell and was kept at 250° F. for 2 hrs. The similar test procedure was followed at 275° F. and gel stability was monitored. All the results on gel stability before (partially neutralized till pH 1.5) and after heating along with changes in pH are documented below.

Corrosion Testing Procedure at 200° F. and 225° F.

In order to check for any interference of the non-iron based crosslinker (that is, the aluminum crosslinker) with other additives, especially on corrosion loss, corrosion testing was carried out. The corrosion testing used N-80 metal coupons at 200° F. and 225° F. The corrosion loss was measured and compared against existing ferric chloride crosslinker. The results on corrosion loss are discussed below.

Avoiding Aluminum Precipitation

It was found in the literature that aluminum precipitates as aluminum hydroxide at pH at or above 6. In order to explore this observation, 0.5% w/v aqueous Al-acetate solution was prepared and then neutralized using 0.1N sodium hydroxide (NaOH) with drop-wise addition at room temperature. The pH was monitored throughout the testing. No precipitation was observed at pH 6, even after keeping the solution in static condition for more than 30 min. The concentration of 0.5% w/v Al-acetate was selected based on the calculation that corresponds to 4.5 gpt of Al-acetate that is used for performance evaluation. Continued neutralization with NaOH revealed trace level colloidal precipitate which was observed at around pH 7.3. There was no slimy, solid precipitate observed, which is a characteristic of aluminum hydroxide. Similar observation was seen when the entire procedure was repeated at 180° F. It is believed that the minimization of any of this precipitation is possible using one or more weak organic acids. According to a preferred embodiment, the weak organic acids are selected from the group consisting of acetic acid, acetic anhydride, citric acid, and any combination thereof.

Stability of Crosslinked Gel at 250° F. and 275° F.

At 250° F. and 275° F., the stability of the crosslinked gel was determined using anionic polymer and cationic polymer gelling agent separately in 20% HCl. Tables A through D show the formulations used in determining the gel stability and the results at temperature testing. The formulations were prepared as per the procedure described above. The gel stability results of Al-acetate crosslinker were compared against existing ferric chloride crosslinker as shown in the following tables.

TABLE A

Formulation A of Anionic Polymer and Stability Testing Results

| Additives | Formulation A with Al | Formulation A with Fe |
|---|---|---|
| Strong Acid | 20% HCl | 20% HCl |
| Gelling Agent | Anionic polymer (20 gpt) | Anionic polymer (20 gpt) |
| Corrosion Inhibitor | Chloromethylnaphthalene quinoline quaternary amine, and isopropanol, aldehyde (10 gpt) | Chloromethylnaphthalene quinoline quaternary amine, and isopropanol, aldehyde (10 gpt) |
| Weak Acid | Glycolic acid 70% (2 gpt) | Glycolic acid 70% (2 gpt) |
| Surfactant | Heavy aromatic petroleum naphtha and isopropanol (1 gpt) | Heavy aromatic petroleum naphtha and isopropanol (1 gpt) |
| Crosslinker | Al-Acetate (4.5 gpt) | Ferric chloride (4.5 gpt) |
| Neutralized with CaCO$_3$ at 250° F. | | |
| Initial Crosslinking Observation | pH 1.5 Remained crosslinked as a lipping gel after test with pH 2.7 | pH 2.3 Remained crosslinked as a lipping gel after test with pH 2.8 |
| Neutralized with CaCO$_3$ at 275° F. | | |
| Initial Crosslinking Observation | pH 1.5 Remained crosslinked as a lipping gel after test with pH 2.5 | pH 2.3 Remained crosslinked as a lipping gel after test with pH 3.1 |

TABLE B

Formulation B of Anionic Polymer and Stability Testing Results

| Additives | Formulation B with Al | Formulation B with Fe |
|---|---|---|
| Strong Acid | 20% HCl | 20% HCl |
| Gelling Agent | Anionic polymer (20 gpt) | Anionic polymer (20 gpt) |
| Corrosion Inhibitor | Propargyl alcohol and methanol (10 gpt) | Propargyl alcohol and methanol (10 gpt) |
| Weak Acid | Glycolic acid 70% (2 gpt) | Glycolic acid 70% (2 gpt) |
| Surfactant | Heavy aromatic petroleum naphtha and isopropanol (1 gpt) | Heavy aromatic petroleum naphtha and isopropanol (1 gpt) |
| Crosslinker | Al-Acetate (4.5 gpt) | Ferric chloride (4.5 gpt) |
| Neutralized with CaCO$_3$ at 250° F. | | |
| Initial Crosslinking Observation | pH 1.5 Remained crosslinked as a lipping gel after test with pH 1.5 | pH 1.2 Remained crosslinked as a lipping gel after test with pH 1.5 |
| Neutralized with CaCO$_3$ at 275° F. | | |
| Initial Crosslinking Observation | pH 1.5 Remained crosslinked as a lipping gel after test with pH 2.5 | pH 1.2 REDUCED VISCOSITY to a pouring fluid after test with pH 2.2 |

TABLE C

Formulation C of Cationic Polymer and Stability Testing Results

| Additives | Formulation C with Al | Formulation C with Fe |
|---|---|---|
| Strong Acid | 20% HCl | 20% HCl |
| Gelling Agent | Cationic polymer (15 gpt) | Cationic polymer (15 gpt) |
| Corrosion Inhibitor | Chloromethylnaphthalene quinoline quaternary amine, and isopropanol, aldehyde (10 gpt) | Chloromethylnaphthalene quinoline quaternary amine, and isopropanol, aldehyde (10 gpt) |
| Weak Acid | Glycolic acid 70% (2 gpt) | Glycolic acid 70% (2 gpt) |
| Surfactant | Heavy aromatic petroleum naphtha and isopropanol (1 gpt) | Heavy aromatic petroleum naphtha and isopropanol (1 gpt) |
| Crosslinker | Al-Acetate (4.5 gpt) | Ferric chloride (4.5 gpt) |
| | Neutralized with $CaCO_3$ at 250° F. | |
| Initial Crosslinking Observation | pH 1.5 Remained crosslinked as a lipping gel after test with pH 2.4 | pH 2.3 Remained crosslinked as a lipping gel after test with pH 2.9 |
| | Neutralized with $CaCO_3$ at 275° F. | |
| Initial Crosslinking Observation | pH 1.5 Remained crosslinked as a lipping gel after test with pH 2.3 | pH 2.3 Remained crosslinked as a lipping gel after test with pH 2.7 |

TABLE D

Formulation D of Cationic Polymer and Stability Testing Results

| Additives | Formulation D with Al | Formulation D with Fe |
|---|---|---|
| Strong Acid | 20% HCl | 20% HCl |
| Gelling Agent | Cationic polymer (15 gpt) | Cationic polymer (15 gpt) |
| Corrosion Inhibitor | Propargyl alcohol and methanol (10 gpt) | Propargyl alcohol and methanol (10 gpt) |
| Weak Acid | Glycolic acid 70% (2 gpt) | Glycolic acid 70% (2 gpt) |
| Surfactant | Heavy aromatic petroleum naphtha and isopropanol (1 gpt) | Heavy aromatic petroleum naphtha and isopropanol (1 gpt) |
| Crosslinker | Al-Acetate (4.5 gpt) | Ferric chloride (4.5 gpt) |
| | Neutralized with $CaCO_3$ at 250° F. | |
| Initial Crosslinking Observation | pH 1.5 REDUCED VISCOSITY to a pouring fluid after test with pH 2.3 | pH 2.3 REDUCED VISCOSITY to a pouring fluid after test with pH 2.9 |
| | Neutralized with $CaCO_3$ at 275° F. | |
| Initial Crosslinking Observation | pH 1.5 REDUCED VISCOSITY to a pouring fluid after test with pH 2.4 | pH 2.3 REDUCED VISCOSITY to a pouring fluid after test with pH 2.8 |

As shown in the tables, all formulations A through C showed good crosslinked gel stability at 250° F. and 275° F. with increase in final pH after the tests.

A reduction in crosslinked gel viscosity was observed after the test in Formulation D with propargyl alcohol and methanol as corrosion inhibitor. Both Al-acetate and ferric chloride crosslinkers showed similar observation with this corrosion inhibitor.

Corrosion Test Results at 200° F. and 225° F.

The corrosion tests were carried out using N-80 coupon in 20% HCl for Al-acetate and ferric chloride crosslinkers at 200° F., and 225° F. for 3 hours. The results at respective temperatures are tabulated in Tables 3 and 4.

TABLE 3

Corrosion Tests at 200° F. Using N-80 Coupon for 3 Hours

| No. | Formula | Corrosion Loss ($lb/ft^2$) |
|---|---|---|
| 1 | Formulation A with Al | 0.0137 |
| 2 | Formulation A with Fe | 0.014 |
| 3 | Formulation B with Al | 0.0055 |
| 4 | Formulation B with Fe | 0.01 |
| 5 | Formulation C with Al | 0.0021 |
| 6 | Formulation C with Fe | 0.0049 |
| 7 | Formulation D with Al | 0.0027 |
| 8 | Formulation D with Fe | 0.0046 |

TABLE 4

| | Corrosion Tests at 225° F. Using N-80 Coupon for 3 Hours | |
|---|---|---|
| No. | Formula | Corrosion Loss (lb/ft$^2$) |
| 1 | Formulation A with Al | 0.0018 |
| 2 | Formulation B with Al | 0.0155 |
| 3 | Formulation C with Al | 0.0078 |
| 4 | Formulation D with Al | 0.01 |
| 5 | Formulation D with Fe | 0.0147 |

All corrosion results are compared against existing ferric chloride crosslinker. At 200° F. and 225° F., both ferric chloride and Al-Acetate crosslinkers passed the corrosion tests.

Summary of Laboratory Results

Use of 28% HCl in in-situ gelling acidizing with Al-Acetate crosslinker is not feasible, as the increase in crosslinked viscosity with acid spend was not achievable. This observation was consistent with existing ferric chloride crosslinker. An optimized 20% HCl with Al-acetate or ferric chloride could deliver the expected performance and hence followed during entire test matrix.

A good crosslinked gel stability was observed using Al-acetate crosslinker in in-situ crosslinking for an acidizing blend with chloromethylnaphthalene quinoline quaternary amine, isopropanol, and aldehyde as corrosion inhibitor at 250° F. and 275° F. A reduction in crosslinked gel viscosity was observed after the test with propargyl alcohol and methanol inhibitor and this observation was consistent with ferric chloride crosslinker as well.

Al-acetate crosslinker has passed successfully the corrosion test at 200° F. and 225° F. and results were comparable against existing ferric chloride crosslinker.

Based on all these lab tests, Al-acetate can replace ferric chloride in in-situ crosslinking for acid stimulation of a carbonate formation. In case the user wants to use a liquid form of the aluminum crosslinker, an 80% w/v aqueous solution, for example, can be prepared and used. The performance of 80% aqueous solution was tested and found unaltered after 2 months of preparation.

CONCLUSION

The present invention is well adapted to attain the ends and advantages mentioned as well as those that are inherent therein.

The inventions are described with respect to presently-preferred embodiments, but are not intended to be limited to the described embodiments. As will be readily apparent to those of ordinary skill in the art, numerous modifications and combinations of the various aspects of the inventions and the various features of the preferred embodiments can be made without departing from the scope and spirit of the inventions. The various elements or steps according to the disclosed elements or steps can be combined advantageously or practiced together in various combinations of elements or sequences of steps to increase the efficiency and benefits that can be obtained from the invention. For example, the function of a single structure described herein sometimes can be performed by more than one part, or the functions of two different structures can be performed by a single or integrally formed part. Such variations are considered within the scope and spirit of the present invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of treating a zone of a subterranean carbonate formation penetrated by a wellbore, the method comprising the steps of:
 (a) forming a treatment fluid comprising:
  (i) water;
  (ii) a water-soluble polymer having at least one functional group that can be crosslinked with aluminum (III); and
  (iii) a water-soluble aluminum carboxylate;
  wherein the pH of the treatment fluid is less than 1;
 (b) introducing the treatment fluid through the wellbore into the zone;
 (c) allowing time for the pH of the treatment fluid to spend in the formation such that the pH of the fluid increases sufficiently for the aluminum to crosslink the polymer to form a crosslinked gel;
 (d) allowing time for the pH of the treatment fluid to continue to spend against the formation such that the pH of the crosslinked gel formed in the zone increases sufficiently to break the crosslinked gel, thereby reducing the viscosity of the crosslinked gel in the zone to a broken fluid; and
 (e) flowing back the broken fluid from the zone.

2. A method of treating a zone of a subterranean carbonate formation penetrated by a wellbore, the method comprising the steps of:
 (a) forming a treatment fluid comprising:
  (i) water;
  (ii) a strong acid;
  (iii) a water-soluble polymer having at least one functional group that can be crosslinked with aluminum (III); and
  (iv) a water-soluble aluminum carboxylate;
   wherein the pH of the treatment fluid is less than the pH required for the aluminum to crosslink the polymer to form a crosslinked gel;
 (b) introducing the treatment fluid through the wellbore into the zone;
 (c) allowing time for the strong acid in the treatment fluid to spend in the formation such that the pH of the fluid increases sufficiently for the aluminum to crosslink the polymer, thereby forming a crosslinked gel in the zone;
 (d) allowing time for the strong acid in the treatment fluid to continue to spend against the formation such that the pH of the crosslinked gel formed in the zone increases sufficiently to break the crosslinked gel, thereby reducing the viscosity of the crosslinked gel in the zone to a broken fluid; and
 (e) flowing back the broken fluid from the zone.

3. The method according to claim 2, wherein the pH of the treatment fluid is less than 1.

4. The method according to claim 2, wherein the water, the strong acid, the water-soluble polymer, and the aluminum are in the continuous phase of the treatment fluid.

5. The method according to claim 2, wherein the strong acid comprises hydrochloric acid.

6. The method according to claim 5, wherein the hydrochloric acid is at a concentration of less than 22% by weight in the water.

7. The method according to claim 2, wherein the water-soluble polymer is anionic.

8. The method according to claim 2, wherein the water-soluble polymer has one or more functional groups selected from the group consisting of: a carboxylic acid group, a carboxylate, and a carboxylate ester.

9. The method according to claim 2, wherein the water-soluble polymer is a terpolymer of 2-acrylamido-2-methylpropane sulfonic acid ("AMPS"), acrylamide, and acrylic acid.

10. The method according to claim 2, wherein the water-soluble polymer is cationic.

11. The method according to claim 2, wherein the polymer has functional groups selected from carboxylate quaternary ammonium salts.

12. The method according to claim 2, wherein the polymer is a polymer of acrylamide with a quaternary ammonium salt.

13. The method according to claim 2, wherein the water-soluble aluminum carboxylate is selected from the group consisting of: aluminum mono-acetate, aluminum di-acetate, aluminum tri-acetate and any combination thereof.

14. The method according to claim 2, wherein the concentrations of the water-soluble polymer and the water-soluble aluminum carboxylate in the water are sufficient to form a fluid or gel state having a viscosity of at least about 300 cP at a shear rate of 100 sec$^{-1}$ at a pH in the range of 1 to 3.

15. The method according to claim 2, wherein the treatment fluid additionally comprises one or more water-soluble weak organic acids having a pKa(1) in water in the range of −1.74 to 12.

16. The method according to claim 15, wherein the one or more weak organic acids have a pKa(1) that are sufficiently low and are in a sufficient concentration in the water such that the water would have a pH less than 3 without the presence of any strong acid.

17. The method according to claim 15, wherein the water-soluble weak organics acids comprise a carboxylic acid.

18. The method according to claim 17, wherein the weak organic acids comprise glycolic acid.

19. The method according to claim 17, wherein an aluminum mono-carboxylate, an aluminum di-carboxylate, and an aluminum tri-carboxylate of the carboxylic acid are water soluble at a pH in the range of 6-7.

20. The method according to claim 2, further comprising, after the step of allowing time to form a gel in the zone: introducing a second treatment fluid into the zone, wherein the second treatment fluid is diverted in the zone by the crosslinked gel previously formed in the zone.

21. The method according to claim 20, wherein the second treatment fluid comprises:
(i) water; and
(ii) an acid;
wherein the pH of the treatment fluid is less than the pH required to break the aluminum crosslinks of the polymer in the zone.

22. The method according to claim 2, wherein the treatment fluid does not include a reducing agent for ferric ions.

23. A method of treating a zone of a subterranean carbonate formation penetrated by a wellbore, the method comprising the steps of:
(a) forming a treatment fluid comprising:
(i) water;
(ii) a strong acid;
(iii) a water-soluble polymer having at least one functional group that can be crosslinked with aluminum (III); and
(iv) a water-soluble aluminum carboxylate;
wherein the pH of the treatment fluid is less than the pH required for the aluminum to crosslink the polymer to form a crosslinked gel;
(b) introducing the treatment fluid through the wellbore into the zone; and
(c) allowing time for the strong acid in the treatment fluid to spend in the formation such that the pH of the fluid increases sufficiently for the aluminum to crosslink the polymer, thereby forming a crosslinked gel in the zone;
wherein the water-soluble polymer is a terpolymer of 2-acrylamido-2-methylpropane sulfonic acid ("AMPS"), acrylamide, and acrylic acid.

* * * * *